US00RE34803E

United States Patent [19]

Chasteen

[11] E Patent Number: Re. 34,803

[45] Reissued Date of Patent: Dec. 6, 1994

[54] TWO-CYCLE ENGINE WITH ELECTRONIC FUEL INJECTION

[75] Inventor: Ronald E. Chasteen, Colorado Springs, Colo.

[73] Assignee: Injection Research Specialists, Inc., Colorado Springs, Colo.

[21] Appl. No.: 836,795

[22] Filed: Feb. 18, 1992

Related U.S. Patent Documents

Reissue of:

[64] Patent No.: 4,901,701
Issued: Feb. 20, 1990
Appl. No.: 345,081
Filed: Apr. 28, 1989

U.S. Applications:

[63] Continuation of Ser. No. 119,626, Nov. 12, 1987, abandoned.

[51] Int. Cl.[5] ..... F02M 45/00; G05D 11/13

[52] U.S. Cl. ..... 123/73 C; 364/431.05; 123/478; 123/480; 123/486; 123/491

[58] Field of Search ..... 123/478, 480, 73 A, 123/65 BA, 383, 502, 440, 492, 489, 486, 73 C, 491; 364/550, 557, 551.01, 510, 431.05; 236/DIG. 8

[56] References Cited

U.S. PATENT DOCUMENTS

| | | | |
|---|---|---|---|
| 3,838,397 | 9/1974 | Watson et al. | 340/172.5 |
| 4,255,789 | 3/1981 | Hartford et al. | 364/431 |
| 4,411,385 | 10/1983 | Lamkewitz | 236/DIG. 8 |
| 4,459,670 | 7/1984 | Yamaguchi et al. | 364/431.10 |
| 4,565,173 | 1/1986 | Oshiage et al. | 123/458 |
| 4,607,962 | 8/1986 | Nagao et al. | 364/557 |
| 4,675,826 | 6/1987 | Gentry et al. | 364/557 |
| 4,691,680 | 9/1987 | Staerzl | 123/491 |
| 4,739,492 | 4/1988 | Cochran | 364/510 |
| 4,751,909 | 6/1988 | Otobe | 123/440 |
| 4,753,204 | 6/1988 | Kojima et al. | 123/440 |
| 4,763,629 | 6/1988 | Okazaki et al. | 123/489 |
| 4,766,868 | 8/1988 | Shibata | 123/440 |
| 4,805,122 | 2/1989 | McDavid et al. | 364/557 |
| 4,821,210 | 4/1989 | Howell et al. | 364/551.01 |
| 4,823,290 | 4/1989 | Fasack et al. | 364/550 |
| 4,843,576 | 6/1989 | Smith et al. | 364/557 |

FOREIGN PATENT DOCUMENTS

| | | | |
|---|---|---|---|
| 59-49337 | 3/1984 | Japan . | |
| 59-229022 | 12/1984 | Japan | 123/491 |

OTHER PUBLICATIONS

English Language Abstract for Document "L", Above-1 page.

English Language Translation for Document "M", (List continued on next page.)

*Primary Examiner*—Raymond A. Nelli
*Attorney, Agent, or Firm*—Richard W. Hanes

[57] ABSTRACT

A fuel injection controlling device for a two-cycle engine comprising an air manifold; a throttle valve; a fuel injector; a fuel supply system including a fuel pump; a battery voltage sensor; an air temperature sensor; an engine speed sensor; a timing sensor; a barometric pressure sensor; a throttle position sensor; a first data processor for receiving and processing sensing signals for determining fuel injector duration and timing and fuel pump operating speed; a first data processor temperature sensor for sensing the relative temperature of certain electronic components in the first data processor; a heater operatively associated with the first data processor electronic components for selectively heating the electronic components; and a second data processor operable independently of the first data processor for receiving an electronic component temperature sensing signal and for generating a control signal to the heater responsive thereto for heating the components when the temperature thereof is below a predetermined minimum value.

* * * * *

The questions raised in reexamination request No. 90/002,861, filed Oct. 9, 1992, have been considered and the results thereof are reflected in this reissue patent which constitutes the reexamination certificate required by 35 U.S.C. 307 as provided in 37 CRF 1.570(e).

4 Claims, 5 Drawing Sheets

OTHER PUBLICATIONS

Above, provided by Protester (as was document M), 12 pp.

Revised Official Translation of Japanese Kokai Patent Pub. No. 59–49337 (Okumura).

Sippi et al., Computer Dictionary and Handbook, H. W. Sams & Co., Inc, Indianapolis, Ind., 1980, pp. 320–321.

Idogawa et al., "A New Microcomputer . . . control System", Third Int'l Conf. on Automotive Electronics, IME, London, 1981, pp. 004–011.

Carley, D. R., et al., "Microprocessors in Automotive Electronics", SOUTHCON/'81 Conf. Rec., Electron. Conv. Pub, CA, 1981, pp. 25/1–7.

Toyoda, T., et al., "Some . . . Electronic Engine Control System" Third Int'l Conf. on Auto. Elec., Mech. Eng. Pub, London, 1981, pp. 61–68.

Peterson & Robbi, "Transforming Engine maps for ROMBIC", 32d IEEE Vehicular Conf. May 1982, IEEE, 1982, pp. 23–26.

CPU
130
150
152
74
50

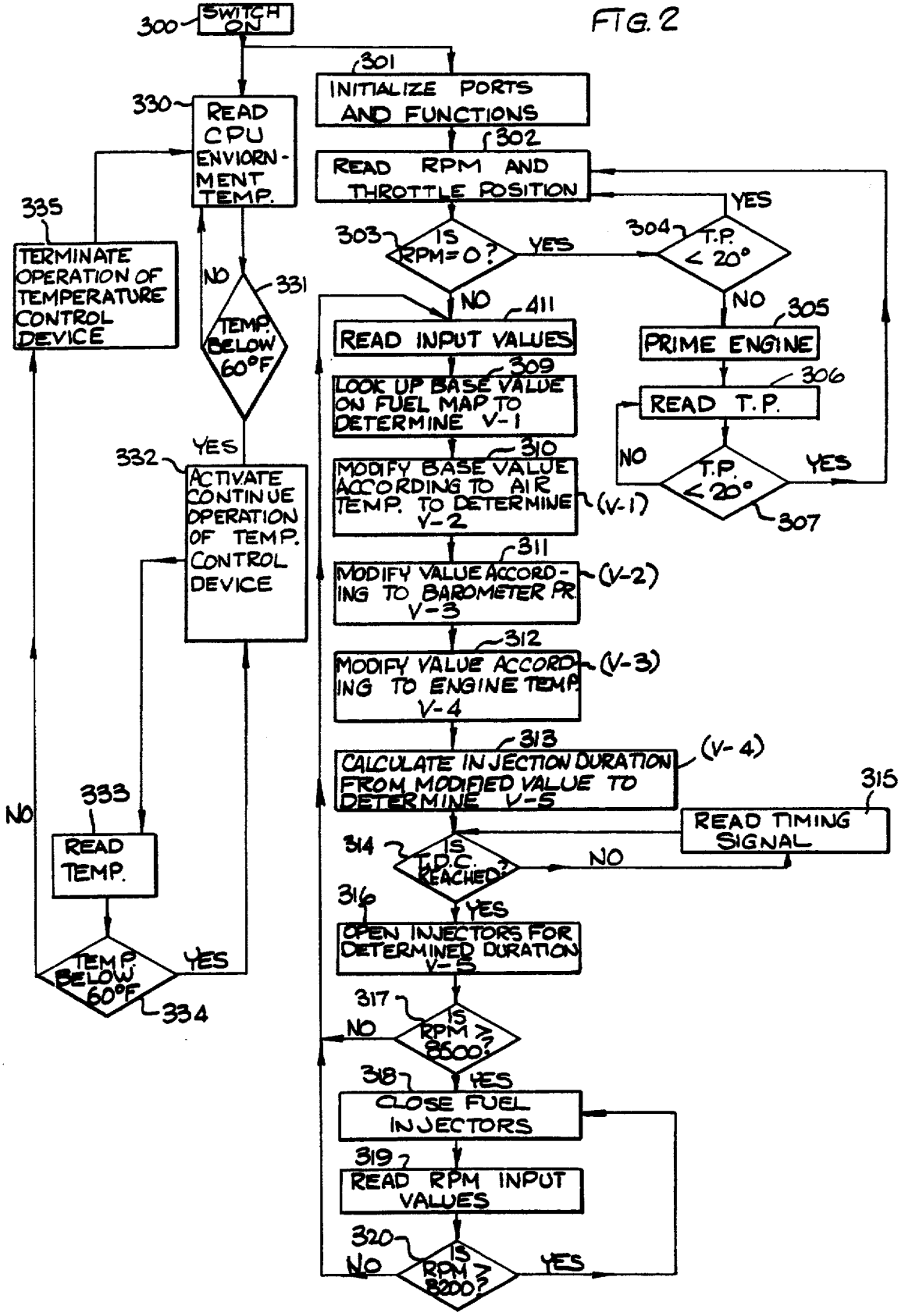
FIG. 2
300 SWITCH ON
301 INITIALIZE PORTS AND FUNCTIONS
302 READ RPM AND THROTTLE POSITION
303 IS RPM=0?
YES
NO
304 T.P. < 20°
YES
NO
305 PRIME ENGINE
306 READ T.P.
307 T.P. < 20°
NO
YES
330 READ CPU ENVIORNMENT TEMP.
331 TEMP. BELOW 60°F
NO
YES
332 ACTIVATE CONTINUE OPERATION OF TEMP. CONTROL DEVICE
333 READ TEMP.
334 TEMP. BELOW 60°F
YES
NO
335 TERMINATE OPERATION OF TEMPERATURE CONTROL DEVICE
411 READ INPUT VALUES
309 LOOK UP BASE VALUE ON FUEL MAP TO DETERMINE V-1
310 MODIFY BASE VALUE ACCORDING TO AIR TEMP. TO DETERMINE V-2
(V-1)
311 MODIFY VALUE ACCORDING TO BAROMETER PR. V-3
(V-2)
312 MODIFY VALUE ACCORDING TO ENGINE TEMP. V-4
(V-3)
313 CALCULATE INJECTION DURATION FROM MODIFIED VALUE TO DETERMINE V-5
(V-4)
315 READ TIMING SIGNAL
314 IS T.D.C. REACHED?
NO
YES
316 OPEN INJECTORS FOR DETERMINED DURATION V-5
317 IS RPM ≥ 8500?
NO
YES
318 CLOSE FUEL INJECTORS
319 READ RPM INPUT VALUES
320 IS RPM ≥ 8200?
NO
YES

FIG. 4

THROTTLE POSITION NUMBER

| RPM | 170 | 135 | 115 | 90 | 75 | 61 | 52 | 44 | 37 | 31 | 25 | 20 | 16 | 13 | 10 | 7 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 500 | 0 | 0 | 0 | 0 | 0 | 0 | 0 | 0 | 0 | 0 | 0 | 0 | 0 | 0 | 0 | 0 |
| 1000 | 0 | 0 | 0 | 0 | 0 | 0 | 0 | 0 | 0 | 0 | 0 | 0 | 0 | 0 | 0 | 0 |
| 1500 | 12 | 12 | 12 | 12 | 12 | 12 | 12 | 12 | 12 | 12 | 12 | 10 | 6 | 4 | 6 | – |
| 2000 | 24 | 24 | 24 | 24 | 24 | 24 | 20 | 16 | 15 | 15 | 13 | 10 | 10 | 10 | 10 | – |
| 3000 | 94 | 94 | 75 | 50 | 50 | 45 | 24 | 24 | 20 | 15 | 8 | 6 | 2 | – | – | – |
| 4000 | 80 | 80 | 42 | 39 | 29 | 37 | 16 | 14 | 12 | 10 | 4 | 2 | – | – | – | – |
| 5000 | 81 | 84 | 52 | 42 | 61 | 54 | 43 | 41 | 30 | 20 | 10 | 6 | – | – | – | – |
| 6000 | 96 | 82 | 54 | 42 | 74 | 61 | 58 | 50 | 40 | 30 | 20 | 10 | – | – | – | 0 |
| 7000 | 29 | 78 | 59 | 39 | 64 | 51 | 50 | 40 | 30 | 20 | 10 | 5 | – | – | – | – |
| 7500 | 47 | 74 | 71 | 43 | 56 | 42 | 40 | 30 | 20 | 10 | 6 | 2 | – | – | – | – |
| 8000 | 66 | 72 | 28 | 47 | 50 | 36 | 32 | 22 | 12 | 2 | – | – | – | – | – | – |
| 8500 | 70 | 60 | 77 | 29 | 40 | 30 | 25 | 15 | 6 | – | – | – | – | – | – | – |
| 9000 | 24 | 60 | 64 | 25 | 30 | 20 | 15 | 10 | 3 | – | – | – | – | – | – | – |
| 9500 | 39 | 60 | 28 | 29 | 25 | 15 | 10 | 5 | 2 | – | – | – | – | – | – | – |
| 10000 | – | – | – | – | – | – | – | – | – | – | – | – | – | – | – | – |

FIG. 5
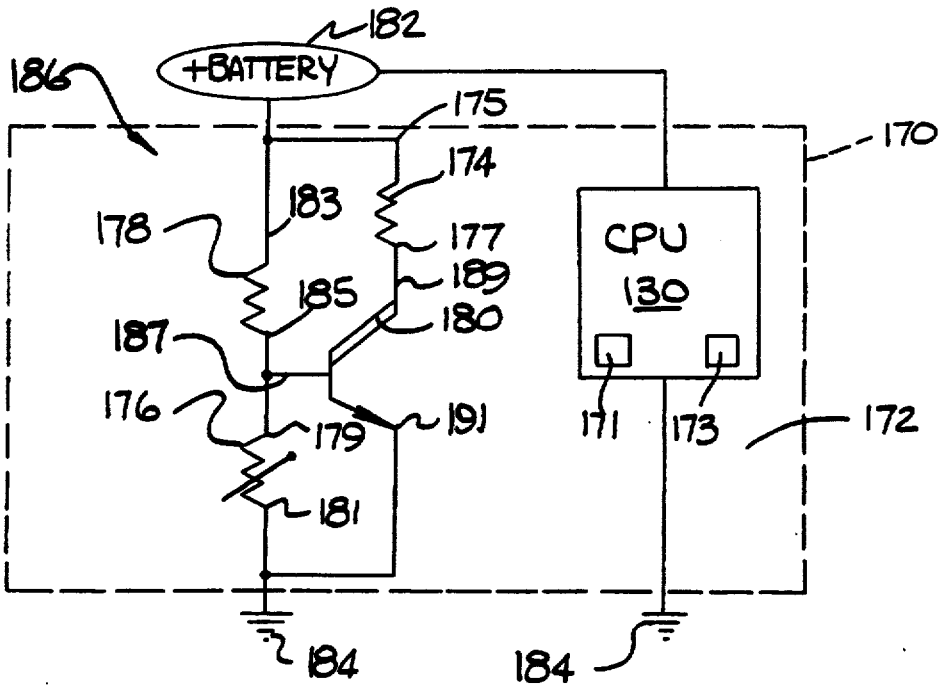
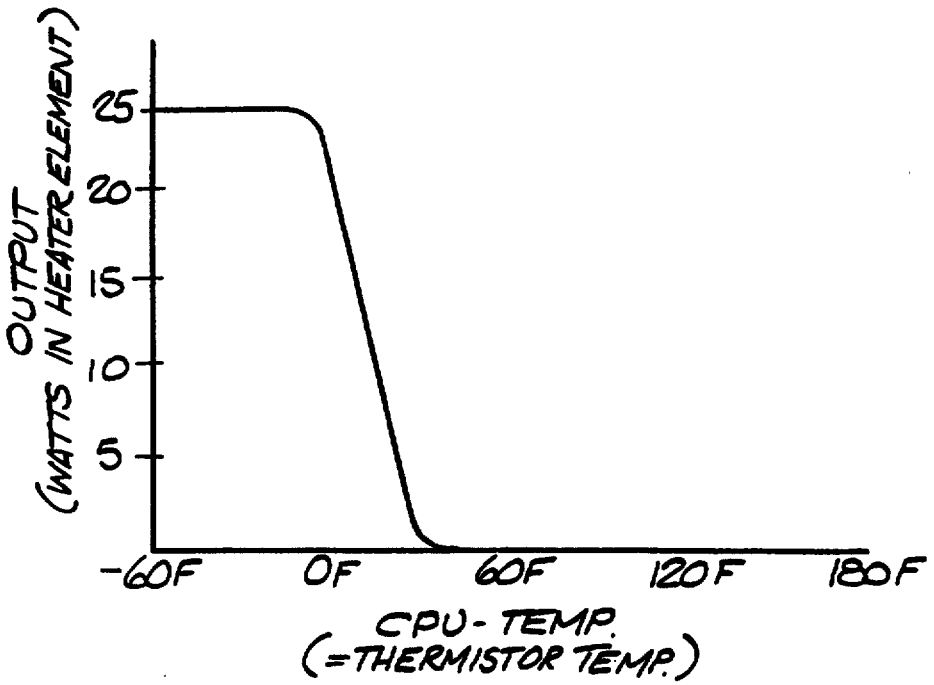
FIG. 6

TWO-CYCLE ENGINE WITH ELECTRONIC FUEL INJECTION

Matter enclosed in heavy brackets [ ] appears in the original patent but forms no part of this reissue specification; matter printed in italics indicates the additions made by reissue.

The present application is a continuation of U.S. patent application Ser. No. 119,626 filed Nov. 12, 1987, *now abandoned.*

BACKGROUND OF THE INVENTION

BACKGROUND OF THE INVENTION

The present invention relates generally to two-stroke operating cycle engines and, more particularly, to a two-stroke engine fuel injection system and control system therefor which are adapted for extreme weather conditions.

Two-stroke operating cycle engines (two-cycle engine), although less fuel-efficient than four-stroke operating cycle engines (four-cycle engines), are capable of developing greater horsepower and torque than a comparably-sized four-cycle engine. This feature has led to the use of two-cycle engines in many environments in which operating efficiency is secondary to torque and weight considerations.

Electronically-controlled fuel injection is widely used in four-cycle engines. In electronic fuel injection used in four-cycle engines, sensor readings associated with various engine operating parameters are used to calculate an optimum fuel/air mixture for the engine. Fuel is then injected directly into the engine's cylinders in the proper amount based upon this electronically determined fuel/air mixture. In some four-cycle engine fuel injection systems, the fuel is injected into an air plenum upstream of the cylinder and is subsequently allowed to enter the cylinder with the plenum air through operation of an intake valve. Electronic fuel injection systems have replaced conventional carburetors in many four-cycle engines, especially in the automotive industry. However, fuel injection is not in general use with two-cycle engines and has not heretofore been used with small-displacement two-cycle engines which are used under severe cold weather conditions, for a number of reasons. Small two-cycle engines are used in association with equipment that is relatively inexpensive as compared to automobiles and other machines with which electronic fuel injection has been widely used in the past. In relatively large, expensive machinery, the cost associated with modifying basic engine components to enable internal mounting of various engine parameter sensors may be justified by increased fuel savings and engine performance and may amount to a relatively small portion of the purchase price of such an automobile, etc. In smaller engine environments, the cost of internal engine modification to existing engine assemblies would, in most cases, far outweigh any fuel savings which might be achieved by an electronic fuel injection unit and would represent a substantial increase in the cost of the associated small machine, e.g. snowmobile, dirt bike, etc., powered by the two-cycle engine.

Fuel injection systems without electronic controls have been used on two-cycle engines, but have not been satisfactory on small-displacement, small-mass two-cycle engines. The reason that fuel injection without electronic control has not been used successfully in small two-cycle engines is that such engines lack flywheels and other high-mass rotating components which tend to stabilize engine operation. [Dueto] *Due to* this lack of a large rotating mass in such engines, even a short duration mismatch between the rate at which fuel is actually delivered to the engine and the optimum engine fuel rate requirements will cause engine sputter or rapid deceleration and stalling. Small, two-cycle engines are especially subject to malfunction under variable operating conditions such as changes in sea level, with associated barometric changes and changes in ambient air temperature. Many machines such as snowmobiles, snowblowers, dirt bikes, etc., are operated in such widely variable operating conditions. In view of the costs associated with engine modification for sensors' need for electronic control of fuel injectors and in view of the fact that the engine parameters which are critical to control of fuel injectors for two-cycle engines were not, prior to the present invention, understood in the art, a successful electronically-controlled fuel injection system for small, two-cycle engines which are subject to extremes in operating conditions has not been developed in the prior art.

OBJECTS OF THE INVENTION

It is an object of the present invention to provide an electronic fuel injection system for a two-cycle engine which requires no internal modification to the basic engine assembly.

It is another object of the present invention to provide an electronic fuel injection control system which may be readily adapted for use with any conventional two-stroke cycle engine assembly.

It is another object of the present invention to provide a relatively small two-stroke cycle engine with electronic fuel injection which is capable of operation under variable and extreme conditions of air temperature and under widely varying barometric pressure conditions.

It is another object of the present invention to provide a fuel injection system for a two-cycle engine in which fuel injection takes place in an air manifold.

It is another object of the present invention to provide a fuel injection and control system for a two-cycle engine in which fuel injectors simultaneously inject fuel into portions of an air manifold which are associated with individual cylinder/crankcases.

It is another object of the present invention to provide a control system for a electronic fuel injection system which utilizes relatively inexpensive electronic components and which is not subject to electronic component malfunction associated with low-temperature operation.

It is another object of the present invention to provide an electronic fuel injection system for a two-cycle engine which includes an electronically-stored fuel map indicative of the optimum fuel requirements for the engine under standard operating conditions over variable engine speed conditions and variable throttle conditions.

It is another object of the present invention to provide an electronic fuel injection system which provides a selected set of operating condition sensor inputs which do not require internal engine unit modifications and which provide optimized engine performance.

SUMMARY OF THE INVENTION

The present invention is directed to an electronic fuel injection system for a small two-cycle engine. One aspect of the invention is a temperature control assembly which is operably associated with an electronic components which are subject to malfunction under low temperature conditions. The electronic components of the heating assembly are not subject to malfunction under low temperature conditions and are designed to produce a heating response which is inversely proportional to temperature below a predetermined threshold temperature. The heating assembly is preferably mounted within a relatively small enclosure which also houses the electronic control system central processing unit. The heating assembly senses the temperature within the relatively small enclosure and rapidly heats electronic components within the relatively small enclosure to a predetermined temperature in response to sensing an environmental temperature within the enclosure which is below the predetermined temperature. The heating system may be actuated at the same time the electronic control system is actuated such as by the turning of the ignition switch of an associated machine, such as a snowmobile, etc.

Another feature of the present invention is [th] *the* provision of an electronically-controlled fuel injection system which has a plurality of sensor inputs which are limited to the sensor inputs which are critical to the operation of a two-cycle engine and which may be mounted externally of a main engine assembly comprising a cylinder crankcase, piston, and crankshaft exclusive of the carburetion/fuel injection system therefor. The electronically-controlled fuel injection system of the present invention may thus be used without modification of existing two-cycle engine assemblies and is controlled by a CPU which may include a programmable memory device such as an EPROM which may be selectively programmed for any particular engine assembly with which the electronic fuel injection system is to be used. Another feature of the invention is the injection of fuel from a fuel injector into a portion of an air manifold which is in direct fluid communication with the crankcase portion of each individual cylinder/-crankcase assembly. This injection of fuel into a manifold upstream of a crankcase provides mixing of a precise amount of fuel and air prior to entry of fuel into the crankcase and also enables all fuel injectors to be opened and closed simultaneously, rather than being timed to the operation of each associated piston.

Thus, the present invention may comprise a control system for controlling the operation of a machine designed to be operated in a relatively broad air temperature, comprising: (a) at least one performance variable sensing means for sensing the present state of a preselected variable associated with machine performance and for generating a performance variable sensing signal indicative of said present state of said preselected performance variable; (b) a first data processing means for receiving and processing said performance variable sensing signal and for generating a control signal based upon the processing of said sensing signal for controlling at least one operating parameter of said machine; said data processing means comprising at least one temperature-sensitive electronic circuit component which is subject to malfunction below a predetermined malfunction temperature which is within said relatively broad operating temperature range of said machine; (c) component environment temperature sensing means for sensing the temperature within the immediate operating environment of said temperature-sensitive electronic circuit component and for generating a temperature signal representative of the sensed temperature; (d) a second data processing means which operates independently of said first data processing means and which is not subject to temperature-related malfunction within said operating temperature range of [s id] *said* machine for processing said signal from said component environment temperature sensing means and generating a heating control signal responsive thereto when the temperature in said electronic circuit environment is sensed to be below said predetermined malfunction temperature; (e) heating means responsive to said heating control signal for heating said temperature sensitive electronic component environment in response to said control signal; (f) power supply means for providing electric energy for operating said control system; (g) switch means for selectively operably electrically connecting or disconnecting said energy supply means and electrically operated components of said control system.

The present invention may also comprise a fuel injection system for a two-stroke cycle engine of the type comprising at least one cylinder, a crankcase associated with said cylinder, a piston reciprocally mounted in said cylinder and crankcase; a reciprocally openable and closable crankcase inlet for enabling combustible fluid to be drawn into the crankcase, a reciprocally openable and closable transfer port for transferring combustible fluid compressed in said crankcase to said cylinder, an ignition system for igniting compressed combustible fluid in said cylinder, a reciprocally openable and closable exhaust port in said cylinder for enabling exhaust of burned combustible fluid from said cylinder, a crankshaft connected to said piston for transferring mechanical energy from said piston to a drive unit, and an electrical energy supply source including a battery for operating the ignition system and other electrical components, comprising: (a) air manifold means operably associated with said crankcase inlet; (b) throttle valve means operably positioned in said air manifold means for controlling airflow into said crankcase inlet, said throttle valve means dividing said manifold means into an upstream portion positioned remote from said crankcase inlet and a downstream portion positioned contiguously with said crankcase inlet; (c) fuel injection means for injecting a fine spray of fuel into said downstream portion of said manifold means whereby a mixture of air and fuel is provided in said downstream portion of said manifold means which is subsequently drawn into said crankcase through said crankcase inlet; (d) fuel supply means for supplying fuel to said fuel injection means comprising: (i) fuel reservoir means for holding a volume of fuel therein and having a reservoir inlet and a reservoir outlet; (ii) fuel circulation conduit means for transferring fuel from said fuel reservoir to said fuel injection means comprising a first end inlet in fluid communication with said fuel reservoir outlet, a second end outlet in fluid communication with said fuel reservoir inlet and an intermediately positioned fuel injection outlet positioned in fluid communication with said fuel injection means; (iii) fuel pump means operatively associated with circulation conduit means at a position thereon between said conduit means first end inlet and said conduit means fuel injector outlet for pumping fuel through said circulating conduit; (iv) pressure limiting regulator means operatively associated with said circulation conduit means at a position thereon between said conduit means fuel injector outlet and said conduit means second end outlet for preventing pressure in said conduit means from exceeding a predetermined maximum pressure; (e) battery voltage sensing means for sensing battery voltage and for providing a battery voltage sensing signal representative thereof; (f) air temperature sensing means for sensing the temperature of air in said upstream portion of said manifold means and for providing an air temperature signal representative thereof; (g) engine speed sensing means for sensing the speed of revolution of said engine and for providing an engine speed signal representative thereof; (h) timing sensing means for sensing each occurrence of a predetermined cyclically repeating state of said engine and for providing a timing signal indicative thereof; (i) barometric pressure sensing means for sensing atmospheric air pressure and for generating a barometric pressure sensing signal representative thereof; (j) throttle position sensing means for sensing the relative amount of opening of said throttle valve means and for generating a throttle position signal representative thereof; (k) first data processing means for receiving and processing said sensing signals comprising: (i) means for processing said engine speed sensing signal and said throttle position sensing signal and for generating a priming control signal to said fuel injection means for selectively injecting or not injecting fuel into said manifold means based on said engine speed signal and said throttle position signal; (ii) means for receiving and processing said engine speed signal and throttle position signal for determining a base fuel injection value; (iii) means for receiving and processing said air temperature signal and calculating an air temperature modification value of said base fuel injection value; (iv) means for receiving and processing said barometric pressure sensing signal for calculating a barometric pressure modification value of said base fuel injection value; (v) means for receiving and processing said engine temperature signal for calculating an engine temperature modification value of said base fuel injection value; (vi) means for determining a total fuel injection value representative of the total fuel amount which is to be injected by said fuel injection means during a single two-stroke operating cycle of said piston from said base fuel injection value, said air temperature modification value, said barometric pressure modification value, and said engine temperature modification value; (vii) means for determining an injector open duration interval based on said total fuel injection value, and a known fuel output rate capacity of said fuel injection means; (viii) means for generating a control signal for opening said injection means for said determined injector duration open interval at a predetermined point in time determined from said timing sensing signal; (ix) means for receiving and processing said engine speed signal for overridingly terminating fuel injection means operation in response to an engine speed sensing signal indicative of a predetermined maximum speed and for restoring fuel injection means operation in response to an engine speed sensing signal indicative of a predetermined restore operation speed lower than said predetermined maximum speed; (x) means for receiving and processing said engine speed sensing signal and for generating a pump control signal in response thereto for maintaining said pump at an optimum operating speed for providing said predetermined maximum operating pressure in said fuel circulation conduit means at said pump; (l) first data processing means temperature sensing means for sensing the relative temperature of certain electronic components in said first data processing means and providing a component temperature sensing signal indicative thereof; (m) heating means operative associated with said first data processing means electronic components for selectively heating said electronic components; (n) second data processing means operable independently of said first data processing means for receiving said electronic component temperature sensing signal and for generating a control signal to said heating means responsive to said component temperature sensing signal for heating said components when the temperature thereof is below a predetermined minimum value.

BRIEF DESCRIPTION OF THE DRAWING

An illustrative and presently preferred embodiment of the invention is shown in the accompanying drawing in which:

FIG. 2 is a flow chart illustrating operations of the electronic control unit of the present invention including the operation of the central processing unit and also the operation of a central processing unit temperature control assembly.

FIG. 4 is a typical engine fuel map expressed in rectangular coordinates.

FIG. 5 is a schematic illustration of an electronic control unit for a fuel injection system.

FIG. 6 is a graph of heater output as a function of CPU temperature for a typical CPU temperature control assembly of the type illustrated in FIG. 5.

DETAILED DESCRIPTION OF THE INVENTION

Figures 1, 1A:
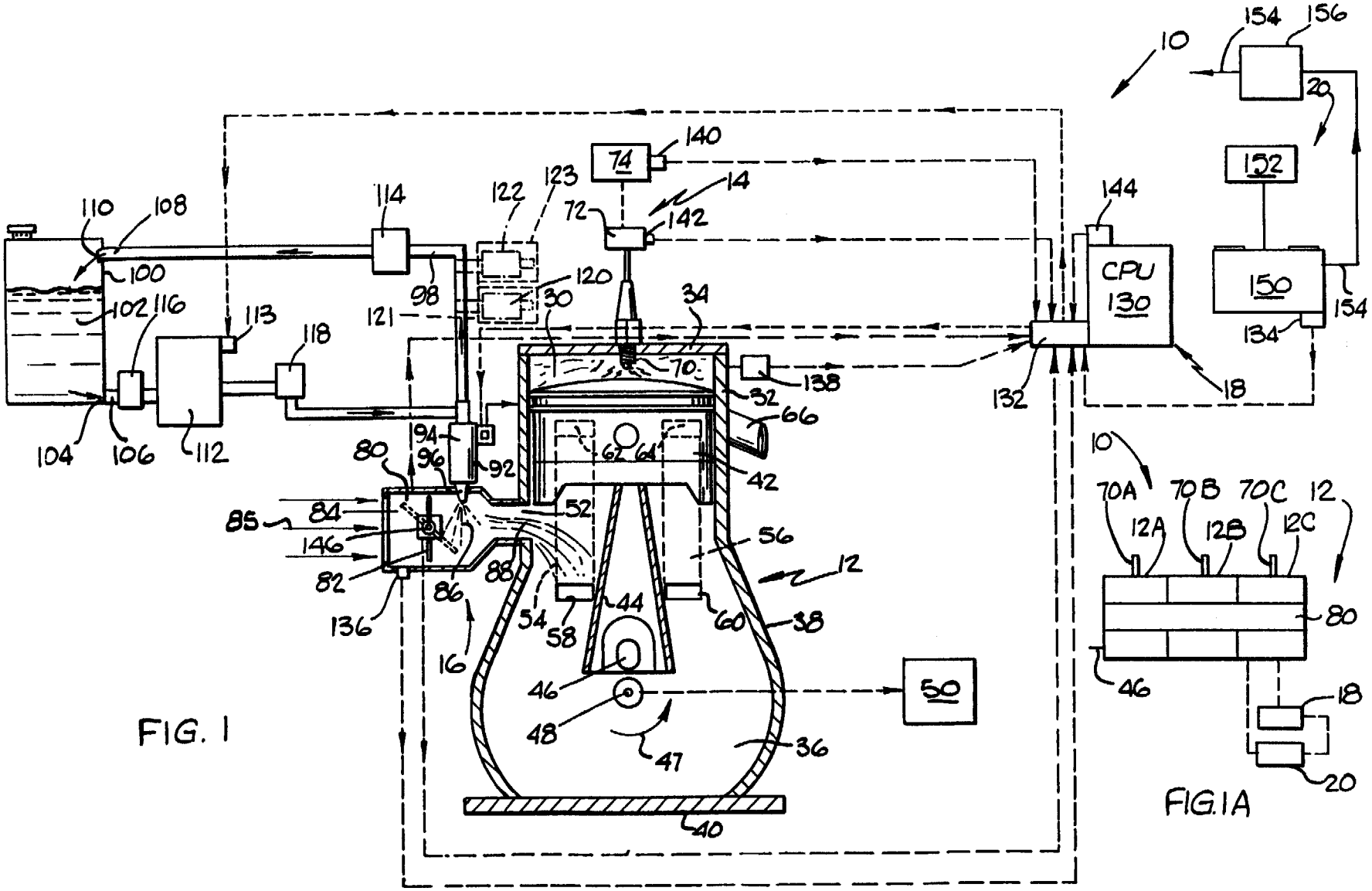
FIG. 1 is a schematic illustration of a two-stroke cycle engine with electronically-controlled fuel injection.
FIG. 1A is a schematic illustration of the engine of FIG. 1 showing additional cylinder portions thereof.

A two-stroke engine unit 10 of the present invention is shown schematically in FIG. 1. In general, the two-stroke cycle engine unit 10 comprises an engine assembly 12, an ignition assembly 14, a fuel/air input assembly 16, an electronic control assembly 18 and an electrical power supply assembly 20.

ENGINE ASSEMBLY

The engine assembly 12 illustrated in FIG. 1 is of a type which is conventional and well known in the art. The engine assembly comprises a cylinder cavity 30 which is generally referred to in the art simply as a cylinder. The cylinder cavity is defined by a cylindrical sidewall 32 and a circular top wall 34 which is fixedly attached to the sidewall 32. The engine assembly also comprises a generally pear-shaped crankcase cavity 36 which is generally referred to in the art simply as a crankcase. The crankcase cavity is defined by a crankcase sidewall 38 which is fixedly connected at the upper portion thereof to a lower portion of cylindrical sidewall 32. The crankcase wall is fixedly connected at a lower portion thereof to a base plate 40. The cylindrical cavity 30 and crankcase cavity 36 thus provide the upper and lower portions of a continuous total engine cavity. A cylindrical piston 42 is slidingly mounted in cylindrical cavity 30 and is pivotally attached to a connecting rod 44 which is, in turn, pivotally attached to a portion of crankshaft 46 which rotates, as indicated at 47, about a crankshaft central axis of rotation 48. The reciprocal motion of piston 42 within cylinder 30 is transferred by connecting rod 44 and crankshaft 46 to a conventional drive assembly 50 of an associated machine such as, for example, a snowmobile 12.

A fuel/air mixture which is sometimes referred to herein as combustion fluid or combustion material is drawn into the crankcase 36 through a combustion fluid inlet 52 sometimes referred to herein as an intake port 52. The intake port 52 is positioned at an upper portion of crankcase 36 and is cyclically opened and closed by reciprocation of piston 42. Transfer passages 54, 56, etc., having crankshaft transfer passage openings 58, 60, etc., and cylinder transfer port openings 62, 64, etc., enable transfer of compressed combustion fluid within the crankcase 36 to the cylinder 30. The cylinder transfer passage openings 62, 64, etc., are cyclically opened and closed through reciprocal motion of piston 42. A cylinder exhaust gas outlet 66 sometimes referred to herein as exhaust port 66 is provided in the cylinder sidewall 32 to discharge burned combustion fluid from cylinder 30. Exhaust port 66 is also cyclically opened and closed by reciprocation of piston 42. The engine assembly may comprise a plurality of cylinder/crankcase/piston assemblies identical to those described above which are operably connected to common crankshaft 46.

The mechanical operation of the two-cycle engine assembly, in general, is as follows. During upward motion of piston 42, crankcase intake port 52 is progressively opened and cylinder transfer passage openings 62, 64 and cylinder exhaust port 66 ar progressively closed causing fuel/air mixture to be drawn into crankcase 3 through port 52 and causing fluid air mixture in cylinder 30 to be retained therein and progressively compressed. When the piston 42 reaches approximately its upward limit of motion or "top dead center" (T.D.C.), sparkplug 70 ignites the fuel/air mixture driving piston 42 downwardly. During the downward movement of the piston, cylinder exhaust port 66 is progressively opened, cylinder transfer port openings 62 and 64 are progressively opened and crankcase inlet 52 is progressively closed causing fuel/air mixture within the crankcase to be compressed and forced through the transfer passages 54, 56 into cylinder 30. The inflow of fresh fuel/air mixture into cylinder 30 is physically channeled into the cylinder in a manner to drive out burned exhaust gas within the cylinder out through exhaust port 66. During the subsequent upward movement of the piston 42, the abovedescribed cylinder fuel/air compression and crankcase fuel/air intake is again repeated, etc.

Ignition Assembly

Ignition assembly 14 comprises a conventional sparkplug mounted within cylinder 34 for igniting the fuel/air mix therein. Sparkplug 70 is conventionally connected to an ignition coil 72 which is, in turn, conventionally connected to an electrical power supply 20 and conventional timing apparatus 74 which may be conventionally linked to crankshaft 46. In an engine assembly with a plurality of cylinder/crankcase/piston assemblies, each cylinder is provided with a spark plug.

Fuel Air Input Assembly

Fuel air input assembly 16 includes an air manifold 80 mounted in fluid communication with crankshaft intake port 52. A throttle valve 82, which in a preferred embodiment comprises a conventional butterfly valve, divides the air manifold 80 into an upstream portion 84 which is in fluid communication with atmospheric air [8] *85* through conventional air filters, etc. (not shown) and a downstream manifold portion 86 which opens directly into crankcase 36. In the case of a multiple cylinder engine, there may be a single manifold upstream portion and a plurality of downstream portions, one for each cylinder/crankcase. An electrically operated fuel injector 92 comprising a solenoid valve portion 94 and a gas jet nozzle portion 96 is mounted so as to discharge a gas spray into the downstream manifold portion 86 to produce a fuel/air mixture in the downstream manifold portion which is subsequently drawn into the crankcase 36. The fuel injector may be of a convention commercially available type such as Bosch 280150-007 available from the Robert Bosch Company, or NAPA 217514 available from Echlin, Inc., Branfort, Conn., 06405. The fuel injector 92 is connected at the solenoid valve end thereof to a fuel circulation conduit 98 which is in fluid communication with a fuel reservoir 102 in the fuel tank 100. The fuel circulation conduit comprises a conduit first end 104 connected to a fuel tank outlet 106 and a second end 108 connected to a fuel tank return inlet 110. An electric fuel pump 112 is provided for pumping fuel, such as gasoline, through the conduit 98. The electric fuel pump 112 is operably connected in fluid communication with the conduit at a point thereon between the fuel tank outlet 106 and the fuel injector 92. Conventional speed control circuitry 113 is provided to control the relative pumping speed of the fuel pump in response to a signal from the electronic control assembly 18 as discussed in further detail below. The fuel pump is conventionally connected to the electrical power supply assembly 20 from which it draws its operating energy. A conventional mechanically operated pressure limiting regulator 114 is operatively mounted in the fuel circulation conduit at a point between the fuel injector 92 and the fuel tank return inlet 110. Pressure regulator 114 prevents the fluid pressure in the circulating conduit from exceeding a predetermined maximum pressure which may be, e.g. 42 psia. A conventional coarse fuel filter 116 may be provided in the circulating conduit between fuel tank outlet 106 and fuel pump 112. A conventional fine fuel filter 118 may be provided in the circulating conduit between the fuel pump and injector 92. As shown in phantom in FIG. 1, the abovedescribed fuel system may be employed to provide fuel to further fuel injectors 120, 122 which are attached in fluid communication with the circulating conduit between the first fuel injector 92 and the pressure regulator 114. These fuel injectors 120, 122 may be mounted in manifold assemblies which may be identical to manifold assembly 16 described above and which are in turn associated with ignition assemblies and cylinder/crankcase piston assemblies 121, 123 which may be identical to those described above and which may be operably connected to a common electronic control assembly 18 and electrical power supply assembly 20.

Electronic Control Assembly

Electronic control assembly 18 includes a central processing unit 130 described in further detail below which is operably connected to conventional interface circuitry 132 which may comprise conventional analog to digital (A/D) circuitry for converting analog sensor signal inputs to digital signal inputs and which may further comprise conventional digital to analog (D/A) interface circuitry used to convert digital CPU command signals to analog command signals which are used to control various engine operating components as described below.

The electronic control assembly comprises a number of sensors having sensor outputs which are provided to the CPU 130 through interface circuitry 132. These sensors may include a battery voltage sensor 134, an air temperature sensor 136, an engine temperature sensor 138, an engine speed sensor 140, an ignition timing sensor 142, a barometric pressure sensor 144, and a throttle position sensor 146. The battery voltage sensor may comprise a conventional sensor or current sensing circuit well-known in the art. The air temperature sensor 136 may comprise a T55101 NAPA sensor mounted in the engine manifold. The engine temperature sensor 138 is mounted on the cooling fins of an air-cooled engine or may comprise a TS 4000 NAPA mounted within the engine cooling water jacket of a liquid cooled engine. The engine speed sensor 140 may comprise a conventional electronic encoder mounted on the crankshaft or associate drive linkage. In such an engine speed sensor configuration, an engine speed value is determined by counting the number of encoder pulses occurring within a fixed time interval. This timing interval may be provided by an external clock pulse signal or a CPU internal clock signal. The ignition timing sensor 142 may comprise an electric signal sensor connected directly to the ignition coil 72 for sensing the time of ignition of each cylinder. In such an ignition timing sensor configuration, the CPU is programmed to respond to only one cylinder ignition pulse per engine revolution. Thus, for example, in a three cylinder engine, the CPU would respond to only the first ignition coil pulse in each three pulse set associated with a complete engine revolution. Similarly, the ignition timing sensor signal may be derived directly from encoder signal 140 simply through counting the number of encoder pulses which are associated with a single revolution of the engine and generating a timing pulse after the occurrence of such a predetermined number of encoder pulses.

Barometric pressure sensor 144 may be mounted in any convenient location where it is exposed to the atmosphere such as, for example, on the housing of the CPU 130. The barometric pressure sensor 144 may be any of a number of commercially available sensors such as a Motorola MPX 201. Throttle position 146 senses the relative amount of opening of the throttle butterfly valve 82 and may comprise a conventional potentiometer unit.

The CPU 130 receives and processes the signals from the various sensors described above and generates control signals which are used to control fuel pump speed, to maintain the speed of operation of the fuel pump at a rate which provides a pressure in the circulation conduit portion immediately downstream therefrom which is approximately equal to the present maximum pressure of the pressure regulator 114. The CPU 130 also generates control signals which actuate the solenoid valve portion 94 of each fuel injector 92 to selectively open and close [and] *each* injector to provide a proper amount of fuel injection into the manifold as determined by the CPU. The CPU 130 may also provide a number of other control functions [a] *as* described in further detail below. The CPU 130, in a preferred embodiment of the invention, comprises a conventional microprocessor chip 171, FIG. 5, such as a Motorola 6502 and a conventional memory chip 173, FIG. 5, which may be a PROM or EPROM chip such as, for example, Motorola 2532.

The electronic control assembly may also comprise a CPU temperature control assembly. One embodiment of such a temperature control system is illustrated in FIG. 5 in which CPU 130 is mounted within a relatively small, e.g. 10 cubic inches, CPU protective enclosure box 170 which defines a local CPU environmental enclosure 172. The box 170 may be 2.5 inches×5 inches×0.75 inches. Also positioned within the CPU environment enclosure are a conventional heating coil 174 having terminals 175, 177, which may have a resistance of 50 ohms, and a conventional thermistor 176, which may be, e.g., an NTC 750 ohm thermistor. The heater element and thermistor are connected as shown in an electronic circuit containing a second resistor 178 having terminals 183, 185 and having a resistance of 10,000 ohms, and a Darlington transistor 180 having a gate terminal 187, a collector terminal 189, and an emitter terminal 191, which may be a Motorola 6668 which may have an amplification of 400%. The circuit containing the circuit elements 174, 176, 178, 180 is connected to the positive pole of a battery 182 and a ground (or negative pole of a battery) 184. The battery 182 may also be used to provide power for CPU 130. Battery 182 may be same or different from the battery 150 used to provide energy to the engine ignition system, etc. The voltage drop across 182, 184 may be, e.g., 5 volts. The characteristics of the particular circuit elements 174, 176, 178, 180 may be selected to provide a heating energy response to particular temperature conditions such as indicated in FIG. 6 for rapidly heating the CPU environment 172 to a predetermined maximum threshold value such as 60° F. It will thus be seen that the heating circuit indicated generally at 186 is adapted to maintain the CPU at a temperature which is above a predetermined low temperature, e.g. 60° F., below which certain components of the CPU are subject to a greatly increased probability of malfunction. It will of course be appreciated that this predetermined temperature may be chosen to have a value well above a temperature at which malfunction is probable. A heating circuit such as illustrated at FIG. 5 may be provided relatively inexpensively and thus eliminates the need for expensive CPU chips which are adapted to be operable under low temperature conditions. The heating circuit such as illustrated at FIG. 5 is adapted to be particularly effective under conditions associated with the usage of snowmobiles and other winter operated machines such as snowblowers, etc.

Electric Power Supply

The engine electric power supply 20 may comprise conventional power supply components such as a battery 150 which may be a conventional 12-volt battery and other power generating devices such as alternator or generator which are represented schematically at 152. Power to the electronic control assembly 18, fuel input assembly 16, and other electrically-operated components may be provided through conventional conductors 154 operably connected to a switching assembly 156 which may be a snowmobile ignition switch, etc.

An engine unit comprising multiple cylinder/crankcase/piston assemblies 12A, 12B, 12C in engine assembly 12 and comprising an ignition assembly with multiple spark plugs 70A, 70B, 70 with a common crankshaft 146 and a common electronic control assembly 18 and a common power supply 20 is shown in FIG. 1A.

Having thus described the overall construction and operation of the two-stroke cycle engine unit 10 in general, certain specific features of the electronic control assembly 18 will now be described in greater detail.

Control System Functions

The basic functional steps performed by the control assembly central processing unit 130 is illustrated in FIG. 2. As illustrated at 300, the control system becomes operational by switching the system on. In a typical use environment such as when the control system is used in associated with a snowmobile engine, step 300 would be performed by turning the snowmobile ignition switch to the "on" position. As illustrated at 301 switching the system on causes electrical energy to be provided to the CPU which initializes all ports and functions of the CPU. Next, the CPU reads the engine speed and throttle position which are indicated as RPM and T.P., respectively, in block 302. Next, as indicated in blocks 303–307, the CPU determines whether or not the engine is to be primed. The sequence of steps 302–307 comprises what will be referred to herein as a "cold start circuit". As indicated at 303, the CPU determines from the reading taken at 302 whether or not the engine RPM is greater than 0. If engine RPM is greater than 0, the CPU next makes the determination from the throttle position reading of 302 whether or not the throttle position is greater than a predetermined amount such as 20°, as indicated in block 304. If throttle position is less than 20°, the CPU decision-making process returns to block 302. If the throttle position is greater than the predetermined amount and RPM=0, the CPU provides a control command to the engine fuel injector(s) to prime the engine. In a preferred embodiment of the invention, an engine priming pulse of a predetermined fixed duration associated with a predetermined fixed amount of fuel, e.g. 100 milliliters per injector, is sent to each fuel injector in response to a prime engine command from the CPU. After an initial engine priming function indicated at 305 has been performed, the CPU again reads throttle position as indicated at 306. After reading the throttle position, the CPU again determines whether or not the throttle position is greater than a predetermined amount such as 20°. If the throttle position is greater than 20°, then the CPU again returns to decision step 306 and repeats step 306, 307 until the throttle position is less than 20°. In a typical operating environment, this would be the equivalent of waiting for an operator to release an opened throttle lever/pedal. Once the throttle position is reduced to below 20°, as indicated at block 307, the CPU decision-making processing returns to block 302, causing the cold circuit decision-making process of blocks 302–307 to be repeated until engine RPM is greater than 0. After engine RPM becomes greater than 0, the CPU reads all of the input values from the various sensors, as shown schematically in FIG. 3.

Figure 3:
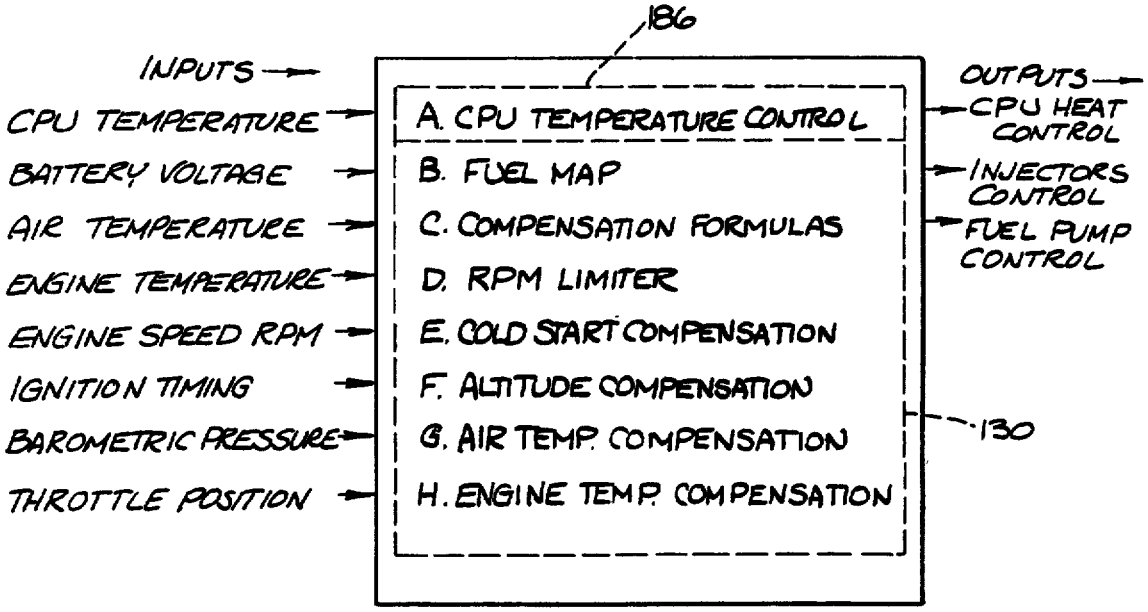
FIG. 3 is a diagram illustrating sensor inputs and control signal outputs and basic functions performed by an electronic control unit.

Next, as indicated at 309, the CPU determines a base fuel valve from a "fuel map" and the engine speed input and the throttle position input. A fuel map is prepared and stored in permanent memory of the CPU based upon the operating characteristics of the particular engine which is being controlled. The fuel map is prepared and stored in permanent CPU memory in an initial production step before the CPU is used to control the engine. A typical fuel map is illustrated in FIG. 3 in which the horizontal axis is indicative of engine RPM value and the vertical axis, as indicated at the right-hand side of the fuel map, is indicative of throttle position. Throttle position may be expressed, for example, in angular degrees of throttle opening or may be expressed in assigned numbers relating, non-linearly, to throttle opening which enables a higher resolution of the fuel map in certain critical regions of an engine power curve. The data array shown in FIG. [3] *4* indicates the optimum base fuel value in milliliters for an engine fuel injector single pulse under predetermined standard operating conditions for any given engine RPM and throttle position. For example, if the engine RPM is 6000 and the throttle position is 25, the optimum base fuel value as indicated from the fuel map is 20 milliliters under standard operating conditions. It will, of course, be appreciated that the information provided in the fuel map may be stored in various electronic forms such as in algorithm form as well as look-up table form. It will also be appreciated that the resolution of the fuel map may be provided to conform with the resolution of the [RP] *RPM* and throttle position sensing signals and with the resolution requirements of the control system.

The base fuel value from the fuel map (FIG. 4) reading performed in block 309 and indicated as V-1 is stored in CPU memory and is modified in steps 310–313 based upon the various input values read in block [308]*411*. As indicated at block 310, the base fuel value is first modified based on the air temperature input. At a predetermined operating temperature, e.g. standard operation conditions of 70° F., no modification is performed. If the temperature is above or below this predetermined value, then the base fuel value is modified accordingly based upon a predetermined algorithm or look-up table which is stored in permanent memory. Algorithms for engine fuel requirement modification based upon ambient air temperature are well-known in the art. The modified base value determined based upon air temperature modification is indicated at V-2.

As indicated in block 311, the modified base value V-2 is next further modified based upon the barometric pressure reading. This modification may again be performed by use of a conventional algorithm or look-up table stored in permanent memory. The resulting modified fuel value is indicated as V-3.

As indicated in block 312, modified value V-3 is next further modified based upon engine temperature. The modified value is indicated as V-4. This modification may be made either from a stored algorithm or a stored look-up table which is prepared based upon the particular engine temperature operating characteristics of the subject engine.

Next, as indicated in block 313, the modified fuel value V-4, which is indicative of the total corrected (compensated) fuel amount that each injector should inject into the engine during each revolution thereof for optimum performance, is used to determine the duration of injector opening which is required to provide fuel injection in the amount of V-4 under predetermined fuel injector parameters, e.g. with a known, constant fixed fuel pressure and a known, fixed injector orifice size, etc. This duration is indicated at V-5 and may be expressed in milliseconds. An alternative to modifying base fuel value is sequential steps as described above in 310–312; relative correction factors may be simultaneously computed based on the variables indicated in 310–312 and a total correction factor may be derived therefrom and applied to the base fuel value to arrive at a total corrected fuel amount V-4.

Next, as illustrated in blocks 314 and 315, the CPU determined whether a predetermined cyclically reoccurring state (repeating once per engine revolution) of the engine, such as, for example, a top dead center position of a selected one of the pistons, has been reached. Once that cyclically reoccurring engine state has been reached, the CPU provides a control command to the fuel injector(s) causing the fuel injector(s) to be opened for the predetermined length of time V-5 calculated in step 313. It will be appreciated that for a multiple cylinder engine the injectors may be opened sequentially at a predetermined spacing in time associated with the piston positions in the various cylinders, or all of the injectors may be opened simultaneously. In the preferred embodiment of the invention, all of the injectors are opened simultaneously due to the fact that, with the injection of fuel into the manifold, as opposed to conventional fuel injection into the crankcase, the sequential timing of injectors in unnecessary.

Next, as indicated in block 317, the engine RPM value from step 308 is compared to a predetermined maximum desired engine RPM such as, for example, 8500 RPM. If the engine speed is less than the predetermined maximum value, then the CPU again returns to operating step [308] *411* and repeats steps [308]*411*-317. If the engine speed is greater than the predetermined value, then, as indicated in block 318, the CPU provides a control signal which closes the fuel injectors.

Next, as indicated in block 319, the CPU again reads the RPM input value. If the RPM input value is greater than a predetermined value which may be less than the maximum engine RPM (e.g. 8200 RPM), then the fuel injectors are retained in a closed positioned as indicated in step 318, and steps 319 and 320 are repeated. If the engine speed is less than 8200 RPM, then the CPU returns to step [308]*411*. Thus, once the engine reaches 8500 RPM, the fuel injectors are closed and remain closed until engine speed drops to 8200 RPM. This total termination of fuel as opposed to conventional speed control methods which simply reduce fuel injection amount or terminate ignition prevents damage to the engine or spark plug fouling associated with such prior art methods.

It will be understood by those with skill in the art that the total corrected (compensated) fuel value may be based on an average derived from several iterations of sensor inputs and total corrected fuel value calculations. It will also be appreciated that the actual fuel adjustments may be made at intervals less frequent that those in which total fuel value calculations are made, e.g. input readings and fuel value calculations may be made 100 times per second and total fuel injection duration may be adjusted 16 times per second.

The CPU 130 may also control pump speed based upon engine RPM. For example, at engine start up when RPM=0, the fuel pump may be actuated by a control signal from CPU 130 to cause it to run at full speed for one second and then stop until RPM is greater than zero. Above RPM=0, the CPU may cause the pump to run at 50% of its rated capacity (drawing one-half its normal maximum current amount) up to a predetermined engine speed, e.g. 3600 RPM. Above this predetermined speed, the CPU may cause the pump to operate at 100% of its rated capacity. Of course, more than two pumping rates may be provided, if desired, based upon a plurality of different engine RPM ranges. Such as arrangement, as well as providing optimum pressure, reduces energy draw on the electrical power supply at start-up and at low RPM.

As further indicated by FIG. 2, the switching on of the ignition, etc., at step 300 also operates a control circuit which functions independently from the CPU 130 which performs the functions indicated in steps 300–320. In this independent circuit, as indicated at step 330, the temperature in the immediate environment of the chip components (e.g. microprocessor, EPROM, etc.) which comprise CPU 130 is initially determined. Next, as indicated at step 331, if the temperature within the CPU environment is greater than a predetermined temperature, such as, for example, 60° F., then the system returns to step 330 and cycles between 330 and step 331. When the temperature in the immediate operating environment of the CPU is sensed to be below the predetermined temperature, then the system actuates a temperature control device, such as a heating coil, to elevate the temperature in the environment of the CPU. Next, as indicated at step 333, the temperature within the operating environment is again read and compared to a predetermined temperature which may be the same or higher than the minimum temperature of step 331. If the temperature is below this second predetermined temperature, such as, e.g. 60° F., then the temperature control device continues to operate. If the temperature exceeds this second predetermined temperature, then the operation of the temperature control device is terminated and the system again returns to step 330.

It will be appreciated that these general control functions described in steps 330–335 apply to any system which is designed to maintain the temperature within a particular environment within a predetermined temperature range. Such temperature control could be performed by any number of conventional heating/air conditioning systems. In the presently preferred embodiment, a temperature control system which is not subject to malfunction at lowered temperatures, e.g - b 60° F., is provided such as illustrated in FIG. 5 and discussed above.

All "Motorola" components indicated herein are commercially available from Motorola, Inc., 8201 E. McDowell Road, Scottsdale, Ariz., 85257-3812. All "NAPA" components indicated herein are commercially available from Echlin, Inc., Branfort, Conn., 06405.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A fuel injection system for a two-stroke cycle engine of the type comprising at least one cylinder, a crankcase associated with said cylinder, a piston reciprocally mounted in said cylinder and crankcase; a reciprocally openable and closable crankcase inlet for enabling combustible fluid to be drawn into the crankcase, a reciprocally openable and closable transfer port for transferring combustible fluid compressed in said crankcase to said cylinder, an ignition system for igniting compressed combustible fluid in said cylinder, a reciprocally openable and closable exhaust port in said cylinder for enabling exhaust of burned combustible fluid from said cylinder, a crankshaft connected to said piston for transferring mechanical energy from said piston to a drive unit, and an electrical energy supply source including a battery for operating the ignition system and other electrical components, comprising:

(a) fuel injection means for injecting fuel for combustion within said cylinder;

(b) fuel supply means for supplying fuel to said fuel injection means;

(c) battery voltage sensing means for sensing battery voltage and for providing a battery voltage sensing signal representative thereof;

(d) air temperature sensing means for sensing the temperature of ambient air and for providing an air temperature signal representative thereof;

(e) engine speed sensing means for sensing the speed of revolution of said engine and for providing an engine speed signal representative thereof;

(f) timing sensing means for sensing each occurrence of a predetermined cyclically repeating state of said engine and for providing a timing signal indicative thereof;

(g) barometric pressure sensing means for sensing atmospheric air pressure and for generating a barometric pressure sensing signal representative thereof;

(h) throttle position sensing means for sensing the relative amount of opening of [said] *a* throttle valve means and for generating a throttle position signal representative thereof;

*(i) engine temperature sensing means for sensing engine temperature and providing an engine temperature signal representative thereof;*

([i]*j) first data processing means for receiving and processing said sensing signals comprising:*

(i) means for processing said engine speed sensing signal and said throttle position sensing signal and for generating a priming control signals to said fuel injection means for selectively injecting or not injecting fuel into [said] *a* manifold means based on said engine speed signal and said throttle position signal;

(ii) means for receiving and processing said engine speed signal and throttle position signal for determining a base fuel injection value;

(iii) means for receiving and processing said air temperature signal and calculating an air temperature modification value of said base fuel injection value;

(iv) means for receiving and processing said barometric pressure sensing signal for calculating a barometric pressure modification value of said base fuel injection value;

(v) means for receiving and processing [said] *an* engine temperature signal for calculating an engine temperature modification value of said base fuel injection value;

(vi) means for determining a total fuel injection value representative of the total fuel amount which is to be injected by said fuel injection means during a single two-stroke operating cycle of said piston from said base fuel injection value, said air temperature modification value, said barometric pressure modification value, and said engine temperature modification value;

(vii) means for determining an injector open duration interval based on said total fuel injection value and a known fuel output rate capacity of said fuel injection means;

(viii) means for generating a control signal for opening said injection means for said determined injector *open* duration [open] interval at a predetermined point in time determined from said timing sensing signal;

(ix) means for receiving and processing said engine speed sensing signal for generating a pump control signal in response thereto for maintaining [said] *a* pump at an optimum operating speed for providing [said] *a* predetermined maximum operating pressure in [said] *a fuel circulation conduit means at said pump.*

*2. A fuel injection system for a two-stroke cycle engine of the type comprising at least one cylinder, a crankcase associated with said cylinder, a piston reciprocally mounted in said cylinder and crankcase; a reciprocally openable and closable crankcase inlet for enabling combustible fluid to be drawn into the crankcase, a reciprocally openable and closable transfer port for transferring combustible fluid compressed in said crankcase to said cylinder, an ignition system for igniting compressed combustible fluid in said cylinder, a reciprocally openable and closable exhaust port in said cylinder for enabling exhaust of burned combustible fluid from said cylinder, a crankshaft connected to said piston for transferring mechanical energy from said piston to a drive unit, and an electrical energy supply source including a battery for operating the ignition system and other electrical components, comprising:*

*fuel injection means for injecting fuel for combustion with air within said cylinder;*

*air temperature sensing means for sensing the temperature of air to be mixed with the fuel and for providing an air temperature signal representative thereof;*

*engine speed sensing means for sensing the speed of revolution of said engine and for providing an engine speed signal representative thereof;*

*engine temperature sensing means for sensing the temperature of the engine and for providing an engine temperature signal representative thereof;*

*timing sensing means for sensing each occurrence of a predetermined cyclically repeating state of said engine and for providing a timing signal indicative thereof;*

*barometric pressure sensing means for sensing atmospheric air pressure and for generating a barometric pressure sensing signal representative thereof;*

*throttle position sensing means for sensing the relative amount of opening of a throttle valve means and for generating a throttle position signal representative thereof;*

*first data processing means for receiving and processing said sensing signals comprising:*

*means for receiving and processing said engine speed signal and throttle position signal for determining a base fuel injection value;*

*means for receiving and processing said air temperature signal and calculating an air temperature modification value of said base fuel injection value;*

*means for receiving and processing said barometric pressure sensing signal for calculating a barometric*

*pressure modification value of said base fuel injection value;*

*means for receiving and processing the engine temperature signal for calculating an engine temperature modification value of said base fuel injection value;*

*means for determining a total fuel injection value representative of the total fuel amount which is to be injected by said fuel injection means during a single two-stroke operating cycle of said piston from said base fuel injection value, said air temperature modification value, said barometric pressure modification value, and said engine temperature modification value;*

*means for determining an injector open duration interval based on said total fuel injection value and a known fuel output rate capacity of said fuel injection means;*

*means for generating a control signal for opening said injection means for said determined injector open duration interval at a predetermined point in time determined from said timing sensing signal.*

*3. A fuel injection system for a two-stroke cycle internal combustion engine having a movable throttle valve, comprising in combination:*

*a fuel injector having means to control the quantity of fuel injected which means is responsive to the characteristics of a signal representing a total fuel injection value,*

*a first data processor, including electronic memory for storing an array of values representing fuel flow rates at predetermined engine operating conditions, addressable as a function of throttle valve position and engine rotational speed and having an output representative of a base fuel injection value,*

*a throttle valve position sensor, including means for addressing the electronic memory,*

*means for addressing the electronic memory with a signal representative of engine rotational speed,*

*a second electronic data processor having an output operably connected to the control means of the fuel injector and responsive to the base fuel injection value and responsive to electronic signals representing air temperature, barometric pressure and engine temperature for modifying the base fuel injection value into the total fuel injection value,*

*an air temperature sensor, including means generating and conducting to the second data processor a signal representative of air temperature,*

*a barometric pressure sensor including means generating and conducting to the second data processor a signal representative of barometric pressure,*

*an engine temperature sensor, including means generating and conducting to the second data processor a signal representative of the engine temperature; and*

*timing sensing means for generating an electrical signal responsive to a predetermined cyclically repeating occurrence in the engine and connected to the input of the second data processor means, for determining the timing of the output of the second data processor.*

*4. A method of controlling the amount of fuel injected per at least one repetitive occurrence into a two-stroke cycle internal combustion engine having a fuel injector and throttle valve comprising the steps of:*

*storing an array of values representing base fuel flow rates at predetermined engine operating parameters and conditions,*

*selecting a base fuel flow rate value as a function of throttle valve position and engine rotational speed,*

*modifying the base fuel flow rate value as a function of engine temperature, air temperature and barometric pressure to obtain a total fuel flow value,*

*controlling the quantity of fuel injected per at least one repetitive occurrence in the engine in response to the total fuel flow value,*

*sensing a predetermined cyclically repeating occurrence in the rotation of the engine, and*

*controlling the occurrence of the fuel injector operation in response to the said sensing.*

* * * * *

UNITED STATES PATENT AND TRADEMARK OFFICE

CERTIFICATE OF CORRECTION

PATENT NO. : RE 34,803
DATED : December 6, 1994
INVENTOR(S) : Ronald E. Chasteen It is certified that error appears in the above-identified patent and that said Letters Patent is hereby corrected as shown below:

Column 1,
Lines 10-12, replace "The present invention is a continuation of U.S. patent application Ser. No. 119,626 filed Nov. 12, 1987, *now abandoned.*" with the following:

-- The present application is a reissue application for reissue of U.S. Patent No. 4,901,701 issued Feb. 20, 1990, which is based on Serial No. 345,081 filed Apr. 28. 1989, which is a continuation of Serial No. 119,626 filed Nov. 12, 1987, *now abandoned.* --

Signed and Sealed this

Twenty-sixth Day of February, 2002

*Attest:*

*Attesting Officer*

JAMES E. ROGAN
*Director of the United States Patent and Trademark Office*